O. RITZ.
RESILIENT BEARING.
APPLICATION FILED APR. 12, 1910.
986,862.
Patented Mar. 14, 1911.
2 SHEETS—SHEET 1.
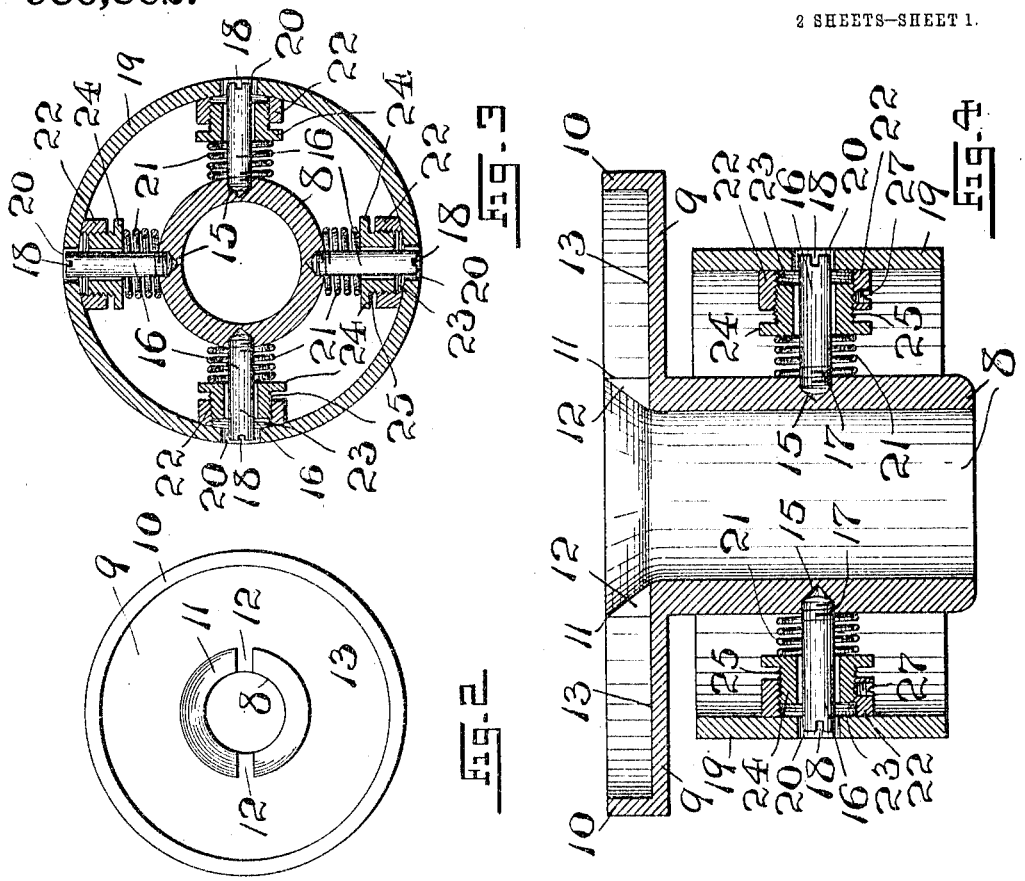
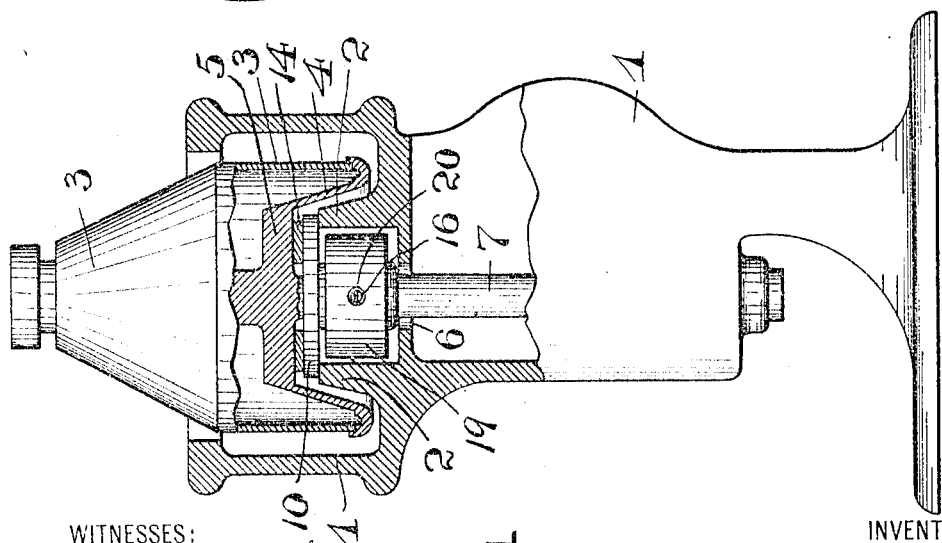
WITNESSES:
Fred'k H. W. Fraentzel
Anna H. Alter
INVENTOR:
Oscar Ritz,
BY Fraentzel and Richards,
ATTORNEYS O. RITZ.
RESILIENT BEARING.
APPLICATION FILED APR. 12, 1910.
986,862.
Patented Mar. 14, 1911.
2 SHEETS—SHEET 2.
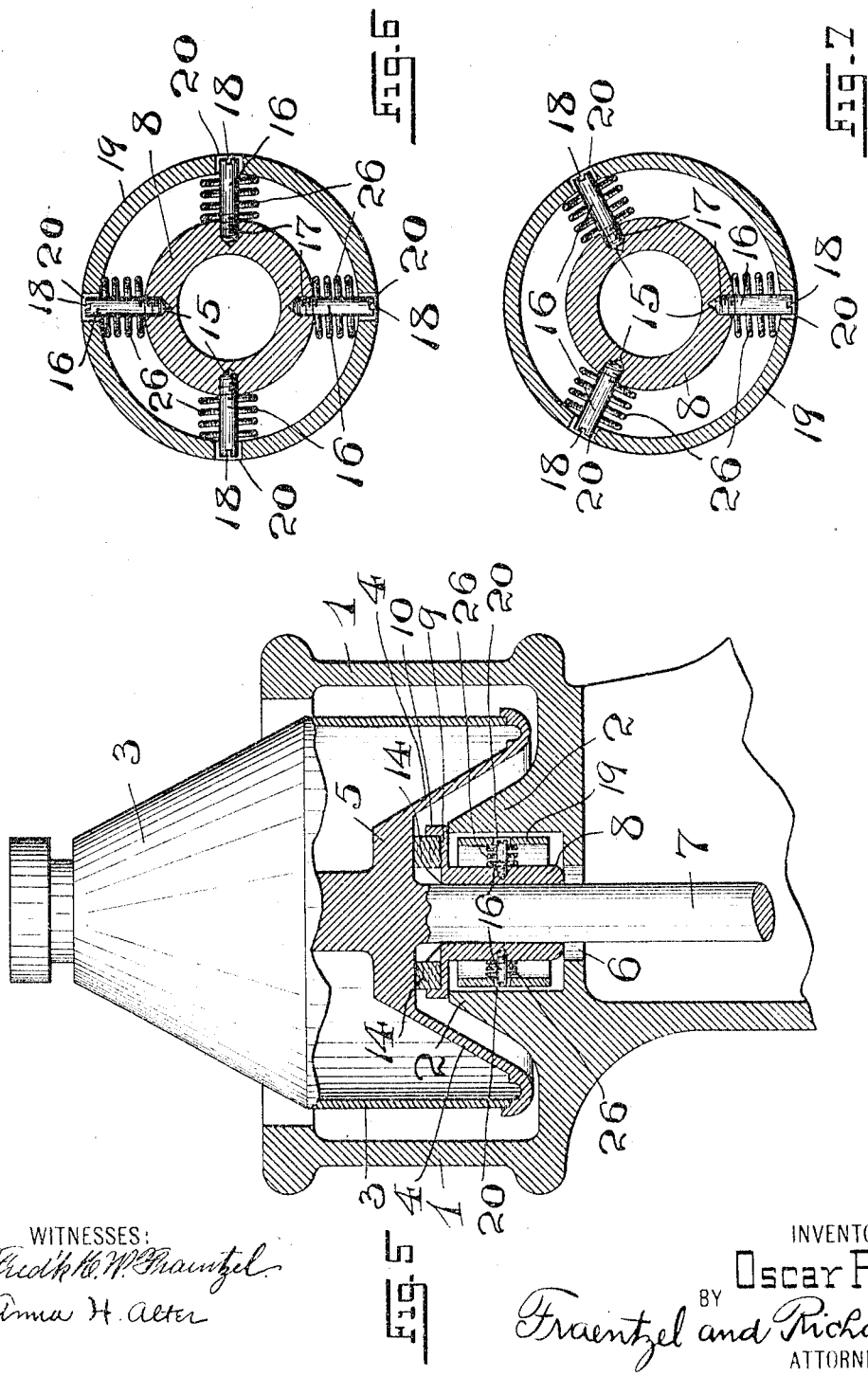
WITNESSES:
Fredk. W. Fraentzel
Anna H. Alter
INVENTOR:
Oscar Ritz,
BY Fraentzel and Richards,
ATTORNEYS

UNITED STATES PATENT OFFICE.

OSCAR RITZ, OF NEWARK, NEW JERSEY.

RESILIENT BEARING.

986,862. Specification of Letters Patent. Patented Mar. 14, 1911.

Application filed April 12, 1910. Serial No. 555,001.

*To all whom it may concern:*

Be it known that I, OSCAR RITZ, a citizen of the United States, residing at Newark, in the county of Essex and State of New Jersey, have invented certain new and useful Improvements in Resilient Bearings; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in resilient bearings; and, the invention relates, more particularly, to improvements in that class of bearings used with shafts or spindles rotating at high speeds, as in centrifugal machines, cream-separators, turbines, and machines, motors and engines of any general construction, running at high speeds.

The invention has reference, more especially, to improvements in the neck-bearings of cream-separators with a view of providing a novel resilient bearing, so that the shaft or spindle of the machine may freely and automatically assume its natural gyratory axis.

The invention has for its further object to provide a novel, simple and effectively operating resilient bearing for the shafts or spindles of the various kinds of machines, motors and engines hereinabove stated, and to provide more especially a novel form of resilient neck-bearing for cream-separators, and to provide a bearing, the parts of which can be readily regulated and adjusted, and that the amount of the resilience can be regulated so that the fast-running shaft will run true and will not be subject to any objectionable oscillations.

Other objects of this invention not at this time more particularly enumerated will be clearly understood from the following detailed description of the present invention.

With the various objects of the present invention in view, the said invention consists, generally, in the novel resilient bearing hereinafter set forth; and, the invention consists, furthermore, in the novel arrangements and combinations of the various devices and parts, as well as in the details of the construction of the same, all of which will be more fully described in the following specification, and then finally embodied in the clauses of the claim which are appended to and which form an essential part of the said specification.

The invention is clearly illustrated in the accompanying drawings, in which:—

Figure 1 is a view partly in side elevation and partly in vertical section of the frame and bowl of one form or style of cream-separator, showing the neck-bearing in vertical section; and, in side elevation, in said neck-bearing, a resilient bearing made according to and embodying the principles of the present invention. Fig. 2 is a top or plan view of the resilient bearing, said view being made on an enlarged scale; Fig. 3 is a horizontal sectional representation of the same, said view being made on a larger scale; and Fig. 4 is a transverse vertical section of said resilient bearing, this view being made on a still larger scale. Fig. 5 is a view of a portion of a cream-separator, the frame and the neck-bearing thereof being represented in vertical section, and the bowl being shown partly in elevation and partly in vertical section, said view showing in connection therewith, and in vertical section, a resilient bearing of a slightly modified form, but still embodying the principles of this invention; and Fig. 6 is a horizontal section of the said resilient bearing, the said view being made on an enlarged scale. Fig. 7 is a horizontal representation of a resilient bearing of another modified construction, but still embodying the principal features of the present invention.

Similar characters of reference are employed in all of the above described views, to indicate corresponding parts.

Referring now to the several figures of the drawings, the reference-character 1 indicates the usual frame-work of any well-known style of cream-separator provided with the neck-bearing 2, in which the resilient bearing made according to the present invention is arranged, substantially in the manner illustrated in Figs. 1 and 5 of the drawings.

The reference-character 3 indicates the usual bowl, of which 4 is the cone-shaped bottom formed with the member or element 5 from which extends in a downward direction through the resilient bearing of the present invention, and through an opening 6, the usual and rapidly revolving shaft or spindle 7. The said resilient bearing which is more particularly shown in Figs. 2, 3, and 4 of the drawings consists, essentially, of a cylindrical tubular body 8 which is formed upon its upper portion with a flat disk-like member or element 9, said member or element being provided with an annular marginal flange 10, and an inner marginal flange 11, preferably of a triangular or similar configuration, substantially as illustrated, and the said flange 11 being provided with suitably formed oil-ducts, as 12, leading from the lubricant-containing space 13, formed by said element 9 and its flanges 10 and 11, into the tubular bearing-member or body 8, as will be clearly evident. When the parts are assembled in the manner shown in said Figs. 1 and 5, the said space 13 contains a suitable packing, as 14, or other lubricant-soaked material. As illustrated, the said tubular bearing-member or body 8 is provided with a number of screw-threaded sockets or holes, as 15, usually four of them, as represented in Fig. 3 of the drawings, although but three of such sockets or holes may be used, as indicated in Fig. 7 of the drawings; but, it will be evident that more than three or four of such sockets or holes 15 may be employed when found necessary, as in the larger sizes of resilient bearings. Screwed into the said screw-threaded sockets or holes 15 are the screw-threaded end-portions 17 of suitable pins 16, said pins thus being made to radiate from the said tubular bearing-member or body 8, and each pin being formed in its end with a slot or groove 18 for the arrangement of the end of a screw-driver therein for securing each pin in its fixed position.

The reference-character 19 indicates a suitably formed tubular body or ring shaped element which is provided with a number of suitably disposed holes or openings, as 20, these holes corresponding to the number of pins 16 which are employed. As shown in the several figures of the drawings, the slotted end-portion of the said pins 16 extend into the said holes or openings, the said holes being a trifle larger than the diameters of the pins, usually about one sixty-fourth of an inch, more or less, and the ends of the screws not extending beyond the outer cylindrical surface of the tubular bearing-member or body 8, but terminating preferably about one sixty-fourth of an inch back of the outer surface of said member or body 8, so that the ring is not fixed with relation to said body and its pins 16.

Encircling each pin 16 is a coiled spring 21 of the proper tension, and loosely arranged upon each pin is a bushing or nut-like member, as 22, which is internally screw-threaded, as at 23, and into which is screwed the externally screw threaded part 25 of an adjusting nut or element 24, the parts 22 and 24 being locked in their adjusted relation by means of the set-screws 27. The previously mentioned springs 21 are arranged between the nut-shaped ends of the said nuts or elements 24 and the inner cylindrical face-portions of the said tubular body or bearing-member 8, substantially in the manner shown in said Figs. 3 and 4, for the proper adjustments of the parts, and for the purpose of regulating the tensions of said springs.

In some cases, if desired, where the neck-bearing of the cream-separating machine is too small to admit of a bearing, such as is shown in Figs. 1 to 4 inclusive, the forms of bearings illustrated in Figs. 5, 6 and 7 may be used, in which case the nut-like members or bushing 22 and the adjusting nuts 24 are dispensed with, the vibratory actions of the rapidly revolving shaft or spindle being taken up by coiled springs 26 which are arranged upon the pins 16 in substantially the manner shown in said Figs. 5, 6 and 7 of the drawings. The said pins 16 are arranged and act in the manner set forth herein-above in connection with the description of Figs. 1 to 4 inclusive, and the remaining parts of the resilient bearing are the same as those already described in said Figs. 1, 2, 3 and 4.

From an inspection more particularly of Figs. 3, 4, 6 and 7 of the drawings, it will be evident, that the tubular body or ring-shaped element 9 with relation to the tubular bearing-member or body 8 is capable of a multiplicity of vibratory movements in horizontal planes at right angles to the vertical central axis of the said body 8. At the same time, however, the said body or ring-shaped element 9 is also capable of a multiplicity of oscillatory or rolling movements with relation to said vertical axis and out of said horizontal planes, limited, of course, to the space found between the marginal surface-portions forming each hole and the cylindrical surface-portion of the free end of said pin extending into the said holes.

From the foregoing description of my present invention, it will be clearly seen that I have devised a simply constructed and efficient bearing which may be used with rapidly revolving spindles or shafts of machines of any style and class, and which is especially adapted for use with those bearings known as neck-bearings, employed in the frame-construction of cream separators.

I am fully aware that changes may be made in the various arrangements and combinations of the several devices and parts, as well as in the details of the construction of the same, without departing from the scope of my present invention as described in the foregoing specification and as defined in the claims which are appended thereto. Hence, I do not limit my invention to the exact arrangements and combinations of the various devices and parts as set forth in the said specification, nor do I confine myself to the exact details of the construction of the said parts as illustrated in the accompanying drawings.

I claim:

1. The combination with the frame-work and neck-bearing of a centrifugal machine, of a resilient bearing comprising a tubular bearing-member, a ring-shaped element, said ring-shaped element being provided with holes, and pins secured at their inner ends to and radiating from said bearing-member, each pin having its outer and free end-portion extending partway into a hole in said ring-shaped element, the cross-sectional area of each pin being less than that of the corresponding hole into which the pin extends, so as to provide a free space surrounding the free end-portion of each pin, and whereby the said ring-shaped element, with relation to said tubular bearing-member, is capable of a multiplicity of oscillatory or rocking movements with relation to the plane of the vertical axis of said tubular bearing-member and out of the horizontal planes to said vertical plane of said axis, substantially as and for the purposes set forth.

2. The combination with the frame-work and neck-bearing of a centrifugal machine, of a resilient bearing comprising a tubular bearing-member, a ring-shaped element, said ring-shaped element being provided with holes, and pins secured at their inner ends to and radiating from said bearing-member, each pin having its outer and free end-portion extending partway into a hole in said ring-shaped element, the cross-sectional area of each pin being less than that of the corresponding hole into which the pin extends, so as to provide a free space surrounding the free end-portion of each pin, and whereby the said ring-shaped element, with relation to said tubular bearing-member, is capable of a multiplicity of oscillatory or rocking movements with relation to the plane of the vertical axis of said tubular bearing-member and out of the horizontal planes to said vertical plane of said axis, and a coiled spring upon each pin encircling that portion of the pin located between the outer peripheral surface of said bearing-member and the inner peripheral surface of said ring-shaped element, substantially as and for the purposes set forth.

3. The combination with the frame-work and neck-bearing of a centrifugal machine, of a resilient bearing comprising a tubular bearing-member, a ring-shaped element, said ring-shaped element being provided with holes, and pins secured at their inner ends to and radiating from said bearing-member, each pin having its outer and free end-portion extending partway into a hole in said ring-shaped element, the cross-sectional area of each pin being less than that of the corresponding hole into which the pin extends, so as to provide a free space surrounding the free end-portion of each pin, and whereby the said ring-shaped element, with relation to said tubular bearing-member, is capable of a multiplicity of oscillatory or rocking movements with relation to the plane of the vertical axis of said tubular bearing-member and out of the horizontal planes to said vertical plane of said axis, a coiled spring upon each pin encircling that portion of the pin located between the outer peripheral surface of said bearing-member and the inner peripheral surface of said ring-shaped element, and means connected with said ring-shaped element for regulating the tension of said coiled springs encircling said pins, substantially as and for the purposes set forth.

4. The combination with the frame-work and neck-bearing of a centrifugal machine, of a resilient bearing comprising a tubular bearing-member, a ring-shaped element, said ring-shaped element being provided with holes, and pins secured at their inner ends to and radiating from said bearing-member, each pin having its outer and free end-portion extending partway into a hole in said ring-shaped element, the cross-sectional area of each pin being less than that of the corresponding hole into which the pin extends, so as to provide a free space surrounding the free end-portion of each pin, and whereby the said ring-shaped element, with relation to said tubular bearing-member, is capable of a multiplicity of vibratory movements in horizontal planes at right angles to the vertical central axis of the said bearing-member, and is capable also of a multiplicity of oscillatory or rocking movements with relation to said vertical axis and out of said horizontal planes, substantially as and for the purposes set forth.

5. The combination with the frame-work and neck-bearing of a centrifugal machine, of a resilient bearing comprising a tubular bearing-member, a ring-shaped element, said ring-shaped element being provided with holes, and pins secured at their inner ends to and radiating from said bearing-member, each pin having its outer and free end-portion extending partway into a hole in said ring-shaped element, the cross-sectional area of each pin being less than that of the corresponding hole into which the pin extends, so as to provide a free space surrounding the free end-portion of each pin, and whereby the said ring-shaped element, with relation to said tubular bearing-member, is capable of a multiplicity of vibratory movements in horizontal planes at right angles to the vertical central axis of the said bearing-member, and is capable also of a multiplicity of oscillatory or rocking movements with relation to said vertical axis and out of said horizontal planes, and a coiled spring upon each pin encircling that portion of the pin located between the outer peripheral surface of said bearing-member and the inner peripheral surface of said ring-shaped element, substantially as and for the purposes set forth.

6. The combination with the frame-work and neck-bearing of a centrifugal machine, of a resilient bearing comprising a tubular bearing-member, a ring-shaped element, said ring-shaped element being provided with holes, and pins secured at their inner ends to and radiating from said bearing-member, each pin having its outer and free end-portion extending partway into a hole in said ring-shaped element, the cross-sectional area of each pin being less than that of the corresponding hole into which the pin extends, so as to provide a free space surrounding the free end-portion of each pin, and whereby the said ring-shaped element, with relation to said tubular bearing-member, is capable of a multiplicity of vibratory movements in horizontal planes at right angles to the vertical central axis of the said bearing-member, and is capable also of a multiplicity of oscillatory or rocking movements with relation to said vertical axis and out of said horizontal planes, a coiled spring upon each pin encircling that portion of the pin located between the outer peripheral surface of said bearing-member and the inner peripheral surface of said ring-shaped element, and means connected with said ring-shaped element for regulating the tension of said coiled springs encircling said pins, substantially as and for the purposes set forth.

7. The combination with the frame and neck-bearing of a centrifugal machine, of a resilient bearing comprising a tubular bearing-member, a ring-shaped element encircling said bearing-member, said ring-shaped element being provided with a number of holes, pins secured to and radiating from said bearing-member, each pin having its opposite end-portion extending into a hole in said ring-shaped element, the cross-sectional area of each pin being less than that of the hole in which it is arranged, and the end-portion of the pin within such hole terminating back of the outer surface of said ring-shaped element so as to allow for lateral motion, a coiled spring upon each pin encircling that portion of the pin located between the outer peripheral surface of the bearing-member and the inner peripheral surface of the ring-shaped element, so as to provide a resilient bearing, and means upon each pin for regulating the tension of each spring, consisting of a screw-threaded bushing loosely arranged upon each pin, and a nut-like member screwed upon the screw-threaded portion of each bushing.

8. A resilient bearing comprising a tubular bearing-member, a ring-shaped element encircling said bearing-member, said ring-shaped element being provided with a number of holes, pins secured to and radiating from said bearing-member, each pin having its opposite end-portion extending into and terminating directly within a hole in said ring-shaped element, the cross-sectional area of each pin at the point where it terminates within said hole being smaller than the cross-sectional area of the hole, a coiled spring upon each pin encircling that portion of the pin located between the outer peripheral surface of the bearing-member and the inner peripheral surface of the ring-shaped element, so as to provide a resilient bearing, and means upon each pin for regulating the tension of each spring, consisting of a screw-threaded bushing loosely arranged upon each pin, and a nut-like member screwed upon the screw-threaded portion of each bushing.

In testimony, that I claim the invention set forth above I have hereunto set my hand this ninth day of April, 1910.

OSCAR RITZ.

Witnesses:
FREDK. C. FRAENTZEL,
FREDK. H. W. FRAENTZEL.